United States Patent

Kaleniecki

[11] Patent Number: 5,174,614
[45] Date of Patent: Dec. 29, 1992

[54] BEARINGLESS ROTARY MECHANICAL FLUID COUPLING

[76] Inventor: James F. Kaleniecki, 3131 Hartford Ct., Rochester Hills, Mich. 48306

[21] Appl. No.: 725,573

[22] Filed: Jul. 3, 1991

[51] Int. Cl.⁵ ............................................. F16L 27/00
[52] U.S. Cl. .................................. 285/279; 285/281; 285/351
[58] Field of Search ............ 285/279, 281, 282, 351, 285/352

[56] References Cited

U.S. PATENT DOCUMENTS

| | | | |
|---|---|---|---|
| 2,390,892 | 12/1945 | McCormack | 285/279 X |
| 2,653,041 | 9/1953 | Wilson | 285/97.3 |
| 2,723,136 | 11/1955 | Deubler | 285/97.3 |
| 3,002,769 | 10/1961 | Deubler et al. | 285/39 |
| 3,211,471 | 10/1965 | Darlington | 285/281 X |
| 3,273,592 | 9/1966 | Deubler et al. | 137/624.13 |
| 3,405,959 | 10/1968 | Walker | 285/276 |
| 3,450,423 | 6/1969 | Favre | 285/279 X |
| 3,889,983 | 6/1975 | Frieze et al. | 285/13 |
| 4,296,952 | 10/1981 | McCracken | 285/98 |
| 4,632,431 | 12/1986 | McCracken | 285/13 |
| 4,817,995 | 4/1989 | Deubler et al. | 285/98 |
| 4,928,997 | 5/1990 | Reisener et al. | 285/13 |
| 5,067,753 | 11/1991 | Porel | 285/279 |

Primary Examiner—Michael F. Trettel
Attorney, Agent, or Firm—Harness, Dickey & Pierce

[57] ABSTRACT

A rotary fluid union comprises a rotor having a sealing surface and mounted into a rotary member, and a stator having a sealing face and mounted in a stationary housing, the rotor and stator being mechanically disconnected other than by the sealing faces thereof being abutted. The sealing faces are abutted to define a gapless sealing interface, normally disposed in a plane perpendicular to the axis of rotation, but inclined to the axis of rotation in situation where the rotary member deflects radially from coincidence with the axis of rotation, whereby the sealing interface plane is at an angle to the perpendicular plane.

12 Claims, 2 Drawing Sheets

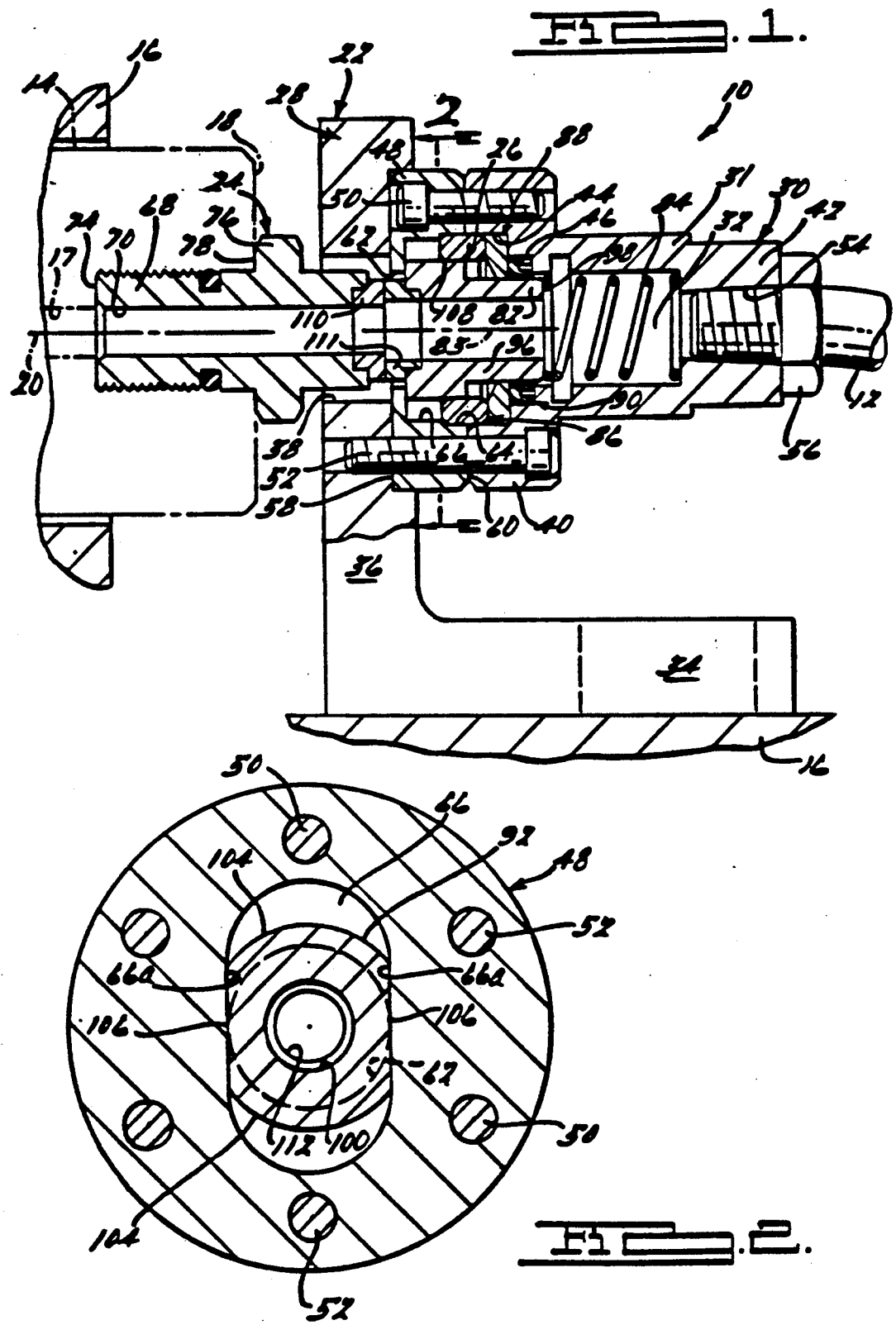

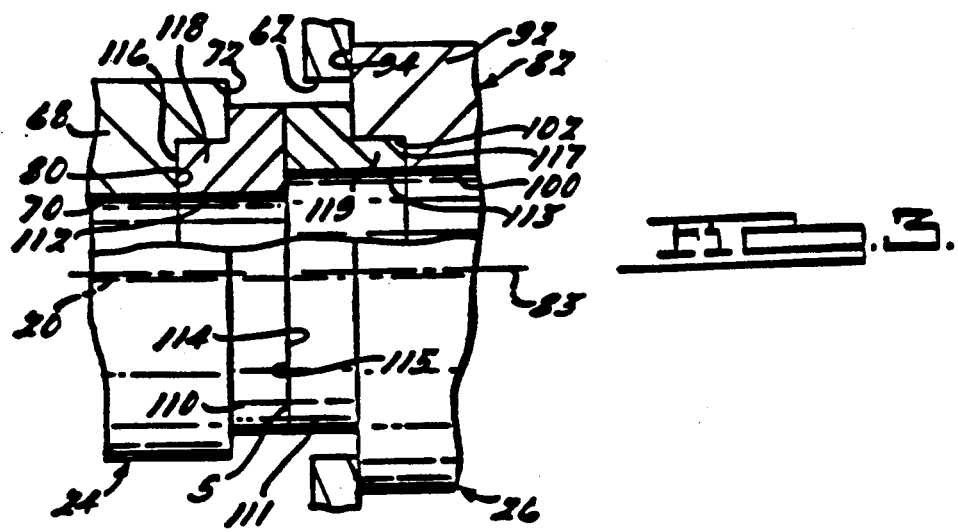
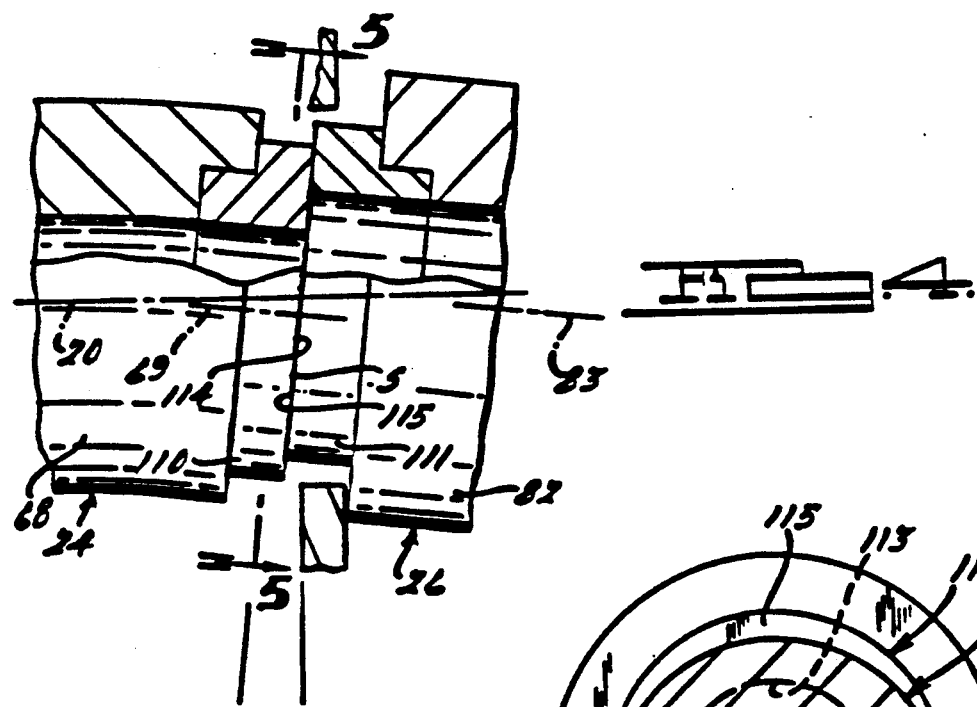
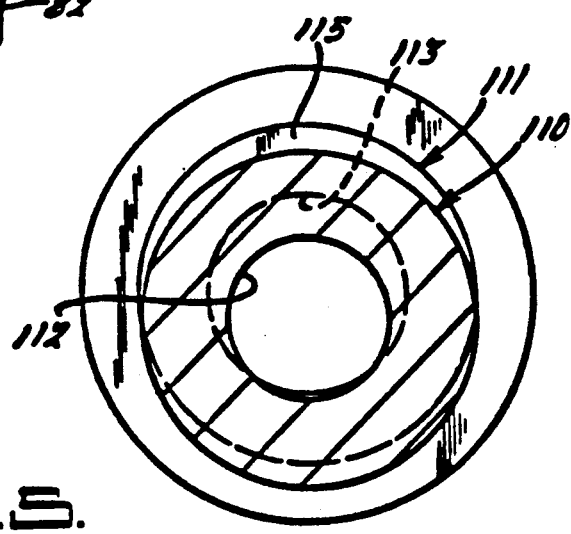

BEARINGLESS ROTARY MECHANICAL FLUID COUPLING

BACKGROUND AND SUMMARY OF THE INVENTION

This invention relates to a fluid tight rotary mechanical fluid coupling between a pair of relatively rotatable seal members in which the fluid sealing occurs between rotating axial mating faces, and more particularly to an arrangement wherein a non-rotating floating seal member is mounted in a housing separate from a rotating seal member and the axial sealing faces are biased into sealed engagement.

Fluid coupling apparatus that incorporates a rotating fluid seal between the axial mateable sealing faces of a pair of relatively rotatable parts thereof is known. Typical of such apparatus is rotary union of the kind used for effecting the transfer of fluid from a stationary fluid source to a fluid conduit in the form of a rotating spindle, shaft, clutch hub or other such device into which fluid is to be fed. Illustrative is "Rotating Union with Replaceable Sealing Assembly" shown in U.S. Pat. No. 4,817,995, issued Apr. 4, 1989 to Deubler et al. wherein a rotor seal member and a stator seal member are assembled in concentric relation in a common housing for relative rotation and passing fluid. The stator and rotor are axially biased towards one another such that the axial seal faces thereof are in engagement and define a rotating seal interface in the housing that is perpendicular to the axis of rotation. The rotor seal member is journalled on a bearing for rotation relative to the housing and includes a threaded shaft which extends from the housing to be affixed to the rotating spindle for rotation therewith.

Fluid conducting rotating unions give satisfactory service when operated at low or moderate speeds, such as about 2,000 rpm, but when operated at relatively high speeds, such as between 4,000 to 6,000 rpm and higher, encounter difficulties, typified by bearing failure, rapid wear, overheating, etc. Likewise, these rotating fluid unions give satisfactory service when conducting fluids at low or moderate pressures, but are oftentimes incapable of holding high pressures, or encounter operating difficulties under high pressures.

While the reasons for failure either at high speed, or high pressure, or combinations of both, are not completely understood, it is generally believed important that the respective rotor, stator, and spindle axes be maintained concentric with the axis of rotation during operation. Vibration and wobble can be produced if the spindle end is not accurately machined, or is damaged, or if the mass of the fluid union is not coaxial with the axis of the spindle.

However, the end face of the threaded rotor shaft and end face of the spindle (or mounting shoulder of the device mounted to) are typically very small, particularly in relationship to the mass and overall geometrical size of the complete fluid union housing which must be cantilevered at the end of the spindle, which can set up a mechanical disadvantage. When installing the union, the spindle end portion must be cleaned of chips and inspected for burrs or dents, such as would prevent accurate engagement between the axial end faces of the spindle and rotor.

Notwithstanding these precautions, at spindle speeds in the 2,500 rpm range and higher, harmonic vibrations can be induced if the mounting surfaces are not perfectly abutted and maintained in a plane perpendicular to the axis of rotation of the spindle to which fluid is to be supplied. These induced vibrations cause bearing failures in the fluid union itself. More seriously, these vibrations can lead to bearing failures in the spindle, or in the item to which the fluid union is mounted. Ultimately this can lead to quality problems and failures in the output operation of the spindle assembly.

The failures, as listed above, are also believed to result in part from the fluid supply hose being supported to the fluid union. The fluid supply hose is typically mounted to a fluid inlet at one end of the housing inlet, whereby to communicate fluid to the stator. Unless supported, this supply hose will place a load on the bearing.

Also, it is believed that tension forces placed on the fluid union in order to support the hose, which forces are countered only by bearings in the fluid union, will produce the same failures.

As is now appreciated, more pressure on the rotating seal interface to maintain axial contact between the sealing faces correlates into more friction, higher torque and thus more wear. A floating seal would be desirable to compensate for possible axial misalignment and wear.

At present, no one-piece fluid coupling unit is believed capable of meeting the demands and loads to which the marketplace is exposing these fluid couplings.

In accordance with this invention, a rotary fluid coupling for effecting the transfer of fluid from a stationary fluid source to a rotary member, such as a spindle, comprises a stationary housing assembly having an interior chamber, a stator assembly including a plunger non-rotatably mounted in the chamber, and a rotor assembly including a sleeve anchored to the spindle for rotation therewith, the rotor and stator assemblies each including a sealing member having a seal face facing axially. The sealing members are mounted, respectively, in the plunger and sleeve such that the sealing faces are engaging. Cooperating flats on the plunger and in the housing prevent the plunger from rotating relative to the chamber but allow the plunger axis to shift or be slightly inclined to the axis of rotation as a result of misalignment of the axis of the spindle end under rotation.

A biasing arrangement in the chamber acts against the plunger to maintain the sealing faces of the two members in abutted engagement to form a gapless rotary sealing interface. The housing assembly comprises an L-shaped bracket having an opening, and a cup-shaped member projecting axially from the bracket and forming therewith the interior chamber and positions the opening adjacent to the rotor. The forward end of the plunger which mounts the seal member thereof is positioned in the opening and is configured so a not to rotate relative to the housing but to permit minor movements of the plunger axis transversely to the spindle axis and as well as axially rearward from the opening along the axis.

The two-piece design wherein the rotor assembly is mounted to the spindle but mechanically separate from the stator assembly, advantageously eliminates the need of costly bearings to support the rotor assembly.

Advantageously, because of its two-piece construction, the fluid coupling herein is smaller, lighter, uses fewer parts, and uses no bearings.

Advantageously, mounting the stator plunger such that the sealing end face thereof "floats" relative to the housing axis and axis of rotation allows the sealing interface to maintain sealed engagement under high rotational speeds without placing forces and movements on bearings.

The rotor assembly herein advantageously mounts to the spindle to allow for a more liberal tolerance to the mounting specifications required of the spindle manufacturer.

The rotor and stator assembly herein advantageously allows the sealing interface to compensate for the spindle axis shifting from coincidence with the rotation axis.

These and other advantages of the present invention will become apparent from the following detailed description taken in conjunction with the accompanying drawings.

BRIEF DESCRIPTION OF THE DRAWINGS

FIG. 1 is a longitudinal side elevational section view of a fluid-tight rotary coupling assembly embodying the principles of the present invention.

FIG. 2 a section view taken along line II—II of FIG. 1.

FIG. 3 is an enlarged side view in section of a sealing interface of the rotary coupling assembly shown in FIG. 1.

FIG. 4 is an enlarged side view in section, similar to FIG. 3, showing misalignment of the sealing interface which could result from high speed rotation or a mass imbalance in the driving elements.

FIG. 5 is a view of the sealing interface taken along line V—V of FIG. 4.

DETAILED DESCRIPTION OF THE PREFERRED EMBODIMENT

Referring now the drawings, FIGS. 1-5 show apparatus in the form of a fluid coupling arrangement, generally indicated by the reference numeral 10 for effecting transfer of fluid from a fluid source, generally indicated by the fluid hose 12, to a rotating fluid conveying conduit, shown in the form of a rotating spindle 14, and such stationary device 16 into which fluid is to be fed. Spindle 14 is generally cylindrical and has a partially threaded axial bore 17 extending axially inward from a forward axial end face 18 thereof. The spindle extends axially outwardly from stationary device 16 and is mounted for rotation about a primary axis 20, the axis of rotation and geometric axis of the spindle being substantially concentric when not rotating.

The fluid coupling arrangement 10 includes a housing assembly 22, a rotor assembly 24, and a stator assembly 26. Housing assembly 22 includes an L-shaped bracket 28 and a cylindrical cup member 30 connected to the bracket whereby to define a chamber 32. Bracket 28 includes a mounting base 34 and a vertical support wall 36 having a cylindrical opening 38 therethrough. Preferably, as shown, bracket 28 is rigidly mounted by base 34 to stationary device 16 and is adapted to position opening 38 of support wall 36 adjacent to the outwardly extended end portion of spindle 14.

Cup 30 includes a cylindrical body 31 having at opposite respective ends an annular, flange 40 and an end wall 42. The interior wall of the body 31 is annularly stepped to form a first and second cylindrical counterbore 44 and 46 axially inwardly from flange 40. A cylindrical mounting flange 48 is fastened to cup flange 40, such as by fasteners 50, and is affixed to support wall 36, such as by fasteners 52. End wall 42 is provided with a threaded bore 54, whereby to receive a fluid connector 56 to receive fluid hose 12 and form a fluid inlet to communicate fluid into the chamber 32.

Cylindrical mounting flange 48, shown best by reference to FIGS. 1 and 2, includes forward and rearward axial end faces 58 and 60, and a central cylindrical bore 62 extending therethrough, end face 58 being adapted to abut cup flange 40. Extending axially inwardly of end face 60 is a cylindrical counterbore 64, and an oval-shaped counterbore 66, the bore 62 and counterbores 64 and 66 being defined about an axis adapted to be aligned with the axis of rotation 20. Oval counterbore 66 includes a pair of parallel flat portions 66a to aid in positioning and maintaining the stator assembly relative to the rotor assembly, in a manner to be described hereinbelow.

The rotor assembly 24 comprises an axial sleeve 68 having a bore 70 extending coaxially between forward and rearward axial end faces 72 and 74, a medial annular shoulder 76 having an axial face 78 adapted to abut end face 18 of the spindle, and a counterbore 80 extending axially inwardly from forward end face 72. The rearward end portion of the sleeve is provided with external thread to enable the sleeve to be threadably anchored into the spindle bore 16 whereby to bring axial face 78 thereof into abutment with the axial end face 18 of the spindle.

Stator assembly 26 is non-rotatably mounted in the chamber 32 and includes an axial plunger 82, a coil spring 84, a seal washer 86, a seal ring 88, and an elastomeric seal 90. The plunger 82 is generally cylindrically-shaped and has a center axis 83 adapted to be coincident with the axis of rotation 20. Plunger 82 includes a forward end portion forming an oval-shaped collar 92 and defining a forward axial end face 94, a reduced diameter rearward end portion 96 defining a rearward axial end face 98, and a bore 100 extending between the end faces 94 and 98 thereof. Collar 92 includes a counterbore 102 that extends axially inwardly from forward end face 94, and is shaped to include a pair of cylindrical sectors 104 and pair of parallel flats 106 sized to permit snug receipt within oval counterbore 66. The flats 66a cooperate to engage flats 106 whereby to prevent rotation of the plunger relative to the collar. The flats 66a and 106 cooperate to allow the collar 92 to translate within the counterbore 66, both in a direction transverse to the axis of rotation, and in a direction generally along the axis of rotation 20 (i.e., axially rearward relative to the flange 48).

Spring 84 has a rearward end abutting the end wall 42 of cup 30 and a forward end engaging rearward end face 98 whereby to urge the plunger 82 axially towards flange 48 and maintain collar 92 within the oval counterbore 66. Although a coil spring is shown for biasing the plunger, the bias member could be other. The spring force is preferably selected to provide only the minimum bias force needed, regardless of fluid pressure, resulting in a freer turning.

Seal washer 86 is generally cylindrical, comprised of steel, aluminum or other durable wearing material, and is mounted within counterbores 44 and 64. Washer 86 includes a cylindrical bore 108 of a diameter slightly greater than oval collar 92 and mounts about the collar in a manner such that slight tilting motion of the collar outer periphery and axis thereof relative to the bore 108 is permitted. Such tilting results in the axis 83 (and the plunger 82) being inclined to the axis of rotation 20.

Seal ring 88 is generally cylindrical, and comprised of steel, aluminum or other durable wearing material. Ring 88 mounts within bore 44 of cup 30 and is in encircling relation about rearward end portion 96 of the plunger.

A hat-shaped seal member 110 and 111 is mounted, respectively, into the counterbore 80 of the rotor sleeve 68 and counterbore 102 of the stator plunger 82. Seal member 110 is provided with a central bore 112 that extends between forward and rearward end faces 114 and 116 and includes a cylindrical body portion 48 adapted to non-rotatably affix the seal member into the counterbore 80. Seal member 111 is provided with a central bore 113 that extends between forward and rearward end faces 115 and 117 and a cylindrical body portion 119 to non-rotatably affix the seal member into the counterbore 102. When mounted into the respective counterbores, forward end faces 114 and 115 face axially outwardly with each of the faces being generally disposed in a plane that is perpendicular to the axis of rotation 20. This plane defines a sealing interface generally indicated by the letter "S". The axes of the bores 112 and 113 are coincident with the axis of rotation prior to rotation. The seal member 111 in the stator assembly 26 is adapted to be positioned in the opening 38 of vertical wall 36.

The sealing members 110 and 111 are comprised of a material which provides long wear. Preferably, one member is comprised of a material such as tungsten carbide and silicon carbide, and abutted against the other member comprised of carbon graphite. The seal faces 114 and 115 are micro-lapped to maintain substantially perfect mating of the seal faces (i.e., evacuate the space between the faces and form an axially gapless interface whereby to substantially effect a hydraulic suction). Such interface allows the stator and rotor assemblies to rotate smoothly and easily with minimum friction to assure long life and still not leak.

FIG. 3 shows the sealing interface, generally indicated by the letter "S", when the rotor assembly is not rotating or rotating at low speeds. The sealing interface "S" is defined by the seal faces 114 and 115 being biased together and is normally perpendicular both to the axis of rotation 20, and to the geometric axis 83 of the plunger and to the axis 69 of the sleeve.

FIGS. 4 and 5 show that during rotation, slight imperfections in the mass distribution of the spindle, may cause the spindle to deflect and the spindle axis to deflect radially, or otherwise shift, from being coincident with the axis of rotation. If so, the sealing interface "S" defined by the seal faces 114 and 115 thereof can become inclined at an angle "A" to the axis of rotation 20. The seal faces remain in complete engagement during this rotation because the oval-shaped collar and counterbore 66, respectively, of the plunger and flange 48, and the seal washer 86 bore 108, are dimensioned such that the plunger can both fit into the opening 38, axially retract relative to the counterbore 66, and move slightly transversely (e.g., radially) from alignment the axis of rotation. That is, the plunger axis 83 can be tilt slightly at the angle "A" relative to axis of rotation. The seal face 115 of the stator assembly seal member 111 can "float" relative to the axis of rotation whereby to maintain planar contacting relation the seal face 114 of the rotor assembly seal member 110.

In the above-described bearingless fluid seal, the failures associated with the prior art are not believed capable of happening because of the following: (1) the mass of the union is separated from the rotating device and is held positive to some form of bracket which is fixed to a rigid component on the machine; therefore, the hose tension has no influence on the union; and (2) the mounting of the union to the rotating equipment only affects the small single adapter portion of the union; and, hence does not require a perfect mounting face to function without influencing the whole union. Further, the bearingless fluid union can run at higher speeds than units used with bearings thereby giving product manufacturers far more flexibility to reach the new technically advanced manufacturing limits. Also, great amounts of manufacturing downtime are saved due to the decreased failures.

While the above description constitutes the preferred embodiment of the invention, it will be appreciated that the invention is susceptible to modification, variation, and change without departing from the proper scope or fair meaning of the accompanying claims.

What is claimed is:

1. A fluid tight coupling for passing fluid between a rotatable member mounted for rotation about an axis and a non-rotatable member, comprising:

a rotor assembly having an axial sealing face and supported only by said rotatable member for rotation therewith;

a stator assmebly comprising an elongated plunger having a central bore extending axially between forward and rearward end portions, said forward end portion forming an oval collar and said collar including an axial sealing face;

support means spaced from the rotor assembly for supporting said stator assembly on said non-rotatable member and so as to be proximate to said rotatable member;

mounting means, defining a chamber with said support means, for mounting said stator assembly so as to be non-rotatable relative to said rotor assembly;

positioning means for positioning said stator assembly in said chamber and relative to said rotor assembly, said positioning means including an oval counterbore being formed in said support means and configured to non-rotatably receive said collar, and biasing means for biasing said collar axially towards said rotor assembly and urging the sealing faces together such that the sealing faces are maintained in fluid tight abutting contacting relation for relative rotation therebetween.

2. The fluid tight coupling as claimed in claim 1 wherein said rotor assembly comprises a cylindrical sleeve having a central bore extending between forward and rearward end portions, the forward and rearward end portions of said sleeve, respectively, including the seal face thereof and being anchored in said rotating member, said sleeve having a primary central axis which is concentric with said axis of rotation when the rotor assembly is not rotating, and the seal face of said rotor assembly being adapted to be in a plane perpendicular to said central axis.

3. A fluid seal between a pair of relatively rotating assemblies, comprising a bearingless rotor assembly having a first end portion for receiving fluid and a second end portion for passing fluid from said first end portion;

a stator assembly for effecting the transfer of fluid from a fluid source to the first end portion of said rotor assembly;

first and second seal members having, respectively, first and second sealing faces, said first seal member being mounted in said rotor assembly for rotation therewith and said second seal member being mounted in said stator assembly and non-rotatable relative to said first seal member;

positioning means for positioning said sealing faces in axially opposed and contacting relation, said positioning means permitting minor movement of said second seal member in a direction transverse to the axis of rotation and axially rearward relative to said first seal member so that the non-rotating second sealing face maintains contact with the rotating first sealing face whereby to inhibit axial gaps from forming between the sealing faces which might otherwise be caused by radial deflection of the end portion of said rotor assembly from axial alignment with the axis of rotation; and bias means acting against said second seal member for axially urging and maintaining the seal faces in contacting engagement.

4. Apparatus for providing a rotating fluid seal between a pair of stationary housing members, including an axial fluid receiving shaft supported in one of said housing members for rotation about an axis, said apparatus comprising:

first and second seal members including, respectively, first and second sealing faces;

first mounting means for fixedly joining said first seal member and said shaft such that said first sealing face is directed in a first axial direction and is constrained to rotate with said shaft, said first mounting means comprising an axial sleeve having first and second end portions and an axial bore extending between said end portions, said first end portion being fixedly anchored in said shaft whereby to position said bore in generally concentric relation with the axis of rotation, and said first sealing member being fixedly anchored to said second end portion;

second mounting means for axially spacing the other of said housing members from said shaft and fixedly joining said second seal member with said other of said housing members such that said second sealing face is directed in a second axial direction opposite to said first direction, said second mounting means preventing said second seal member from rotating relative to said other of said housing members and said axis and comprising a cylindrical body having a forward end portion fixedly receiving said second seal member; and positioning means for positioning the sealing faces into abutting relation and permitting the inclination and position of said second seal face to change upon any misalignment of said shaft from concentric relation with the axis of rotation whereby to maintain the face seals of said seal elements in a mutually abutting relationship to thereby form a rotating seal interface, said positioning means including cooperating flats operating between said cylindrical body and said second mounting means to inhibit significant movement of but permit minor motion of said second seal member relative to said shaft.

5. The invention as claimed in claim 4, further wherein said positioning means positions said first and said second seal members so as to be generally concentric with respect to the axis of rotation and geometric axis of said shaft.

6. A rotary fluid coupling for effecting transfer of fluid between a first member characterized by a central geometric axis and a second member, said first member being mounted for rotation about an axis of rotation and relative to said second member, comprising:

a housing spaced from said first member and including a chamber, said second member being mounted in said chamber;

mounting means, separate and apart from said housing, for supporting said first member for rotation relative to said second member;

a sealing element non-rotatably affixed to each said member, each said sealing element having a flat axial sealing face and an axial bore opening on the sealing face for passing fluid, said sealing faces being in relative rotating contact with one another to define a sealing interface that is generally disposed in a plane which is perpendicular to the axis of rotation; and positioning means including a spring mounted in said chamber and in engagement with said second member for permitting said second member to undergo minor axial and angular movement relative to the axis of rotation to maintain the sealing faces in fluid tight abutment should the first member drift from alignment with said axis of rotation during rotation.

7. A fluid coupling for effecting the flow of fluid from a stationary first housing and a rotatable mounted in a stationary second housing to receive said fluid, compriusing:

an annular first seal member non-rotatably affixed to the shaft for rotation therewith and having a flat first seal face facing in a first axial direction and towards said second housing;

support means for mounting the second housing in spaced relation to said seal member whereby said seal member is supported solely by said shaft;

an annular second seal member having a flat second seal face; and mounting means for mounting said second seal member in said second housing such that said second seal face is facing in a second axial direction and towards said first housing, said support means and mounting means cooperating to permit said second seal member to float relative to said mounting means and position said annular seal faces into a fluid tight abutting relation whereby to define a sealing interface.

8. A fluid tight rotary coupling for passing high pressure fluid, comprising:

stationary first and second housings mounted in spaced-apart relation, said first housing including wall means forming a fluid chamber and defining a fluid inlet for passing fluid into the chamber and an outlet opening therefrom;

an axially elongated centrally bored plunger disposed in said chamber, said plunger including a forward end portion defined by an oval shaped collar and a reduced diameter rearward end portion;

a centrally bored first seal member anchored into the bore of said collar and having a flat sealing face disposed in said opening and facing said second housing;

positioning means defining an oval shaped counterbore in said chamber concentric with said opening for receiving said collar and preventing rotation of said plunger;

bias means for normally biasing said collar into said counterbore;

a centrally bored spindle mounted for rotation relative to said second housing and having an end portion projecting outwardly therefrom so as to be proximate said opening; and a centrally bored second seal member anchored into the bore of said spindle and having a flat sealing face facing said first housing whereby said first and second sealing faces are disposed in fluid tight abutting relation, said positioning means cooperating with said biasing means to permit minor movement of the plunger whereby to maintain the sealing faces in contacting relation should the spindle deflect radially from concentricity with the axis of rotation.

9. A method of effecting the transfer of a fluid from a fluid source to the axial bore of a rotation spindle extending from a first housing into which fluid is to be fed, the steps of the method comprising:

non-rotatably anchoring the rearward end portion of a first seal member having an axial bore extending therethrough and between forward and rearward ends thereof into the axial bore of said spindle, said seal member being adapted to receive fluid at the forward end thereof and pass fluid through the bore and into the spindle at said rearward end;

mounting the rearward end portion of a second seal member having an axial bore extending therethrough and between forward and rearward ends thereof into a stationary housing, said stationary housing being separate and apart from said spindle and said mounting being such as to inhibit rotation of said second seal member relative to the spindle, and said second seal member being adapted to receive fluid at the rearward end thereof and pass fluid through the bore thereof and outwardly of the forward end thereof and into the bore in said first seal member;

lapping the respective forward ends and of said seal members prior to said anchoring and mounting steps such that each forward end defines a precise flat sealing face; and positioning the lapped sealing faces so as to be in abutted fluid tight contacting relation.

10. A fluid tight coupling for passing fluid between a rotatable member mounted for rotation about an axis and a non-rotatable member, comprising:

a rotor assembly comprising a cylindrical sleeve having an axis and an axial sealing face and supported only by said rotatable member for rotation therewith, the sleeve projecting from said rotatable member and the sealing face thereof forming the terminus of said sleeve;

a stator assembly comprising a cylindrical plunger having an axis and a configured collar at one end thereof, said one end having an axial sealing face;

support means spaced from the rotor assembly for supporting said stator assembly on said non-rotatable member and so as to be proximate to said rotatable member;

mounting means, defining a chamber with said support means, for mounting said stator assembly so as to be non-rotatable relative to said rotor assembly;

positioning means for positioning said stator assembly in said chamber and relative to said rotor assembly such that the sealing faces are maintained in abutting contacting relation for relative rotation therebetween; and bias means for biasing the sealing axial faces together into fluid tight relation, said positioning means comprising a configured counterbore for receiving and permitting minor movement of said configured collar therewithin whereby minor radial motion of said sleeve axis is permitted so as to maintain abutting relation of the sealing faces should the axis of the rotating sleeve become non-coincident with the axes either of rotation or of the plunger.

11. In a rotary union of the type including a stator assembly including a stationary stator housing and a non-rotating sealing face, a rotor assembly including a rotating sealing face, positioning means for positioning the assemblies such that the sealing faces are adjacent to one another to pass fluid therebetween, and biasing means for biasing the sealing faces together to form a fluid tight planar sealing interface, the improvement wherein said positioning means comprises a first bearingless mounting means for mounting the rotor assembly independent of said stator housing and for rotation relative to said stator assembly; and a second bearingless mounting means for mounting the stator assembly in said housing, said second bearingless mounting means being adapted to allow the stationary sealing face to shift relative to the plane of said sealing interface should the rotating sealing face during rotation be disposed at an angle to or be displaced relative the axis of rotation.

12. A seal assembly, comprising a bearingless rotor assembly mounted for rotation about an axis of rotation and having an end portion, a seal member carried by said end portion for rotation therewith, said seal member having a planar sealing face adjacent to the end of said rotor assembly and a fluid receiving bore adapted to rotate about a first axis, a stationary housing positioned adjacent to the rotor assembly, a bearingless stator assembly mounted in and keyed to the housing and having an end portion, a non-rotating seal member carried by the stator end portion and having a planar sealing face disposed about a second axis, bias means for biasing the sealing faces of said sealing members together into fluid tight relation and to form a planar sealing interface therebetween, positioning means for positioning the assemblies such that each of said axes are initially substantially coincident, the non-rotating seal member being adapted to float relative to its engagement with the rotating seal member and maintain the seal faces in contacting relation and the first and second axes of said sealing faces in generally perpendicular relation to said planar interface independent of the axis of rotation.

* * * * *

UNITED STATES PATENT AND TRADEMARK OFFICE
CERTIFICATE OF CORRECTION

PATENT NO. : 5,174,614

DATED : December 29, 1992

INVENTOR(S) : James F. Kaleniecki

It is certified that error appears in the above-identified patent and that said Letters Patent is hereby corrected as shown below:

Col. 1, Line 18 after "is" insert --a--.

Col. 2, Line 54 "a" should be --as--.

Col. 3, Line 20 insert --is-- after 2.

Col. 8, line 25, Claim 7, insert --shaft-- after rotatable.

Col. 9, line 15, Claim 9, replace "rotation" with --rotating--.

Signed and Sealed this

Ninth Day of November, 1993

Attest:

BRUCE LEHMAN

Attesting Officer

Commissioner of Patents and Trademarks